No. 750,535. PATENTED JAN. 26, 1904.
E. R. GOINGS.
EVAPORATOR.
APPLICATION FILED JULY 16, 1903.
NO MODEL.
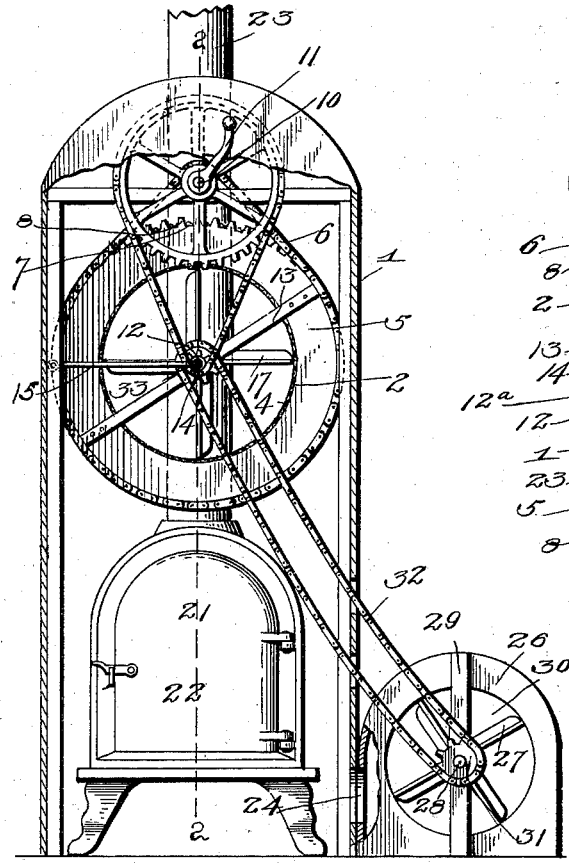
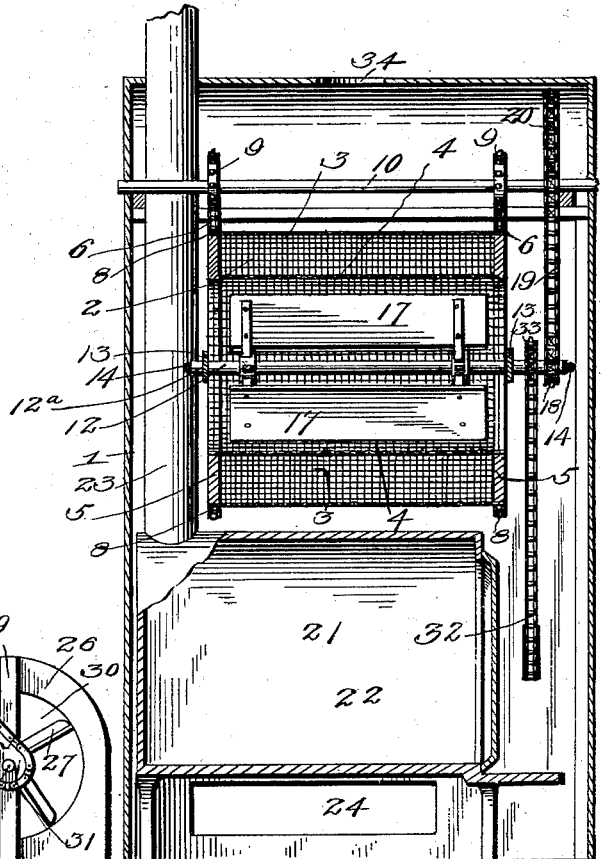
Witnesses
Inventor
E. R. Goings
By H. B. Wilson
Attorney No. 750,535. Patented January 26, 1904.

UNITED STATES PATENT OFFICE.

ELISHA R. GOINGS, OF CLAY CITY, ILLINOIS.

EVAPORATOR.

SPECIFICATION forming part of Letters Patent No. 750,535, dated January 26, 1904.

Application filed July 16, 1903. Serial No. 165,822. (No model.)

*To all whom it may concern:*

Be it known that I, ELISHA R. GOINGS, a citizen of the United States, residing at Clay City, in the county of Clay and State of Illinois, have invented certain new and useful Improvements in Evaporators; and I do declare the following to be a full, clear, and exact description of the invention, such as will enable others skilled in the art to which it appertains to make and use the same.

My invention relates to evaporators, and more particularly to improvements upon the fruit, vegetable, or cereal evaporator shown and described in my United States Patent No. 722,693, dated March 17, 1903.

The object of my present invention is to improve and simplify the construction of evaporators of this character, thereby rendering the same more durable in use and efficient in operation.

With this and other objects in view the invention consists of certain novel features of construction, combination, and arrangement of parts, which will be hereinafter more fully set forth, and defined in the appended claims.

In the drawings, Figure 1 is a front elevation, partly in section, of my improved evaporator. Fig. 2 is a vertical front-to-rear sectional view through the same, taken on the line 2 2 of Fig. 1; and Fig. 3 is a detail sectional view through the cylinder or evaporating-receptacle.

Referring to the drawings by numeral, 1 denotes a suitable casing or housing, in the upper portion of which is disposed a rotary receptacle 2, comprising an outer wall 3 and an inner wall 4, spaced from said outer wall by rings or annular heads 5, which close the ends of the chamber or space formed between said walls. Said walls are preferably composed of wire netting or gauze and are preferably cylindrical in form, the inner wall being concentric with the outer one. Said receptacle or cylinder is suspended within the casing 1 by means of sprocket-chains 6, which pass about sprocket-wheels 7, formed by teeth 8, secured upon the peripheries of the rings 5, and said chains also pass about sprocket-wheels 9, secured upon a horizontal shaft 10, journaled in bearings secured to the top of frame 1. Said shaft has its front end provided with a crank-handle 11, by means of which it may be rotated in order to rotate said cylinder, as will be readily understood. In order to prevent the cylinder from swinging and to steady the same, a horizontal shaft 12 in the form of a hollow tube or pipe is concentrically disposed in said cylinder and is passed through bearings 12$^a$, formed in cross bars or arms 13, secured upon the outer faces of said rings 5. A steadying-rod 14 passes through said tubular shaft or pipe 12 and has its ends 15 bent at right angles and secured to the frame, as seen in Fig. 1. The fruit, vegetables, cereals, or other substances to be evaporated or dried are contained in the space or chamber between the two walls of the cylinder, and a hinged door 16 is provided in the outer wall 3 to permit the fruit or other substance to be deposited in and removed from said cylinder.

In order to distribute and force the heated air rising from a heater contained in the casing 1, as hereinafter described, through the substance to be evaporated, I secure a fan 17 upon said shaft 12 within the inner cylindrical wall 4 of the cylinder and rotate the same by connecting a small sprocket-wheel 18 upon the front end of shaft 12 by a sprocket-chain 19 to a large sprocket-wheel 20, secured upon the front portion of the shaft 10. The rotary motion of shaft 10 will thus be imparted to shaft 12, which will turn in the bearings 12$^a$ and is steadied by the rod 14.

Located in the bottom of casing 1 directly beneath the cylinder is a heater 21, which may be of any description. As conventionally illustrated in the drawings, the same consists of a stove 22, provided with a smoke-pipe 23, which passes up in the rear portion of the casing and out through the top of the same. An air inlet or opening 24 is formed in the center of one side of the casing 1 adjacent to its lower end and at a point below the bottom of the stove, which is supported above the bottom of the casing by legs 25. Said opening 24 registers with a similar opening formed in a fan or blower casing 26, located at one side of the casing 1. Within said casing 26 is a fan 27, secured to a horizontal shaft 28, journaled in bearings formed in cross-bars 29, which cross the air-inlet openings 30 in the ends of said casing 26. The fan 27 is rotated by securing to its shaft a sprocket-wheel 31 and connecting the same by a sprocket-chain 32 to a sprocket-wheel 33, secured upon the shaft 12 at its front end. Said chain 32 passes through a suitable opening in one side of casing 1, and a suitable outlet-opening 34 for the heated air and vapors is provided in the top of casing 1. The latter is also provided with suitable doors to permit of access to the heater 21 and the cylinder 2.

The operation of my improved evaporator is as follows: The fruit or other substance to be evaporated or dried is placed in the cylinder 2, as previously stated, and the air within the casing is heated by the stove or other heater 21. The crank-handle 11 is then turned to rotate the cylinder, the fan 17 within the same, and the fan or blower 27 by means of the gearing previously described. It will be seen that the air forced into the casing 1 beneath the heater will be thoroughly heated as it rises and passes around the same, and when it reaches the cylinder the fan within the same will distribute it and force it through the substance contained in the cylinder. After being thus brought into contact with the fruit or other substance and absorbing the moisture from the same it is discharged through the opening 34 in the top of the casing.

From the foregoing description, taken in connection with the accompanying drawings, the construction, operation, and advantages of my invention will be readily understood without requiring a more extended explanation.

Various changes in the form, proportion, and the minor details of construction may be resorted to without departing from the principle or sacrificing any of the advantages of my invention.

Having thus described my invention, what I claim as new, and desire to secure by Letters Patent, is—

1. An evaporator comprising a suitable casing, a shaft journaled in said casing, means for rotating said shaft, a receptacle within said casing adapted to contain the substance to be dried, and means for simultaneously suspending said receptacle and rotating the same from said shaft, substantially as described.

2. An evaporator comprising a suitable casing, a shaft journaled in the upper portion of said casing, means for rotating said shaft, a cylindrical receptacle within said casing, sprocket-chain gearing between said shaft and receptacle, adapted to both suspend and rotate said receptacle, a shaft journaled within said receptacle, a fan carried by said shaft, and means for rotating the latter-mentioned shaft, substantially as described.

3. An evaporator comprising a suitable casing, a shaft journaled in the upper portion of said casing, means for rotating said shaft, a cylindrical receptacle within said casing, sprocket-chain gearing between said shaft and receptacle, adapted to both suspend and rotate said receptacle, a shaft journaled within said receptacle, a fan carried by said shaft, means for rotating the latter-mentioned shaft, a heater in said casing, below said receptacle, and a blower or fan adapted to force the evaporating medium into said casing below said heater, substantially as described.

4. An evaporator comprising a suitable casing, a shaft journaled in the upper portion of said casing, means for rotating said shaft, a cylindrical receptacle within said casing, sprocket-chain gearing between said shaft and receptacle adapted to both suspend and rotate said receptacle, a shaft journaled within said receptacle, a fan carried by said shaft, a driving connection between said shafts, a heater in said casing beneath said receptacle, a blower or fan adapted to force the evaporating medium into said casing below said heater, and a driving connection between said blower and the latter-mentioned shaft, substantially as described.

In testimony whereof I have hereunto set my hand in presence of two subscribing witnesses.

ELISHA R. GOINGS.

Witnesses:
FREDK. BLACK,
JOHN Z. GILL.